United States Patent
Hsu

(10) Patent No.: US 11,618,820 B2
(45) Date of Patent: Apr. 4, 2023

(54) RESIN COMPOSITION AND ARTICLE MADE THEREFROM

(71) Applicant: Elite Material Co., Ltd., Taoyuan (TW)

(72) Inventor: Ching-Hsien Hsu, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 111 days.

(21) Appl. No.: 17/071,322

(22) Filed: Oct. 15, 2020

(65) Prior Publication Data

US 2022/0081559 A1    Mar. 17, 2022

(30) Foreign Application Priority Data

Sep. 15, 2020  (TW) ................................ 109131602

(51) Int. Cl.
    *C08L 71/12*  (2006.01)
    *C08L 79/08*  (2006.01)

(52) U.S. Cl.
    CPC ............. *C08L 71/123* (2013.01); *C08L 79/08* (2013.01); *C08L 2205/025* (2013.01); *C08L 2205/035* (2013.01)

(58) Field of Classification Search
    CPC .................................................. C08L 71/126
    See application file for complete search history.

(56) References Cited

U.S. PATENT DOCUMENTS

| | | | | | |
|---|---|---|---|---|---|
| 6,005,050 | A | * | 12/1999 | Okada ..................... | C08L 25/06 525/92 H |
| 6,166,137 | A | * | 12/2000 | Brown .................. | C08L 71/126 524/262 |
| 2008/0251271 | A1 | * | 10/2008 | Jeyakumar ............. | H02K 5/132 174/110 SR |
| 2018/0258282 | A1 | * | 9/2018 | Wang ..................... | C08K 3/014 |

* cited by examiner

*Primary Examiner* — Ana L. Woodward
(74) *Attorney, Agent, or Firm* — Muncy, Geissler, Olds & Lowe, P.C.

(57) ABSTRACT

A resin composition includes 80 parts by weight to 160 parts by weight of a vinyl-containing resin, 0.1 part by weight to 1.0 part by weight of a first compound and 0.1 part by weight to 2.0 parts by weight of a second compound; wherein the vinyl-containing resin includes a vinyl-containing polyphenylene ether resin, a maleimide resin, a bis(vinylphenyl) ethane, a triallyl isocyanurate, a vinyl-containing polyolefin resin or a combination thereof, the first compound includes a structure of Formula (1) to Formula (3) or a combination thereof, and the second compound includes a structure of Formula (4) to Formula (6) or a combination thereof. Moreover, an article may be made from the resin composition, including a prepreg, a resin film, a laminate or a printed circuit board.

20 Claims, 2 Drawing Sheets

RESIN COMPOSITION AND ARTICLE MADE THEREFROM

CROSS-REFERENCE TO RELATED APPLICATION

This application claims the priority benefits of Taiwan Patent Application No. 109131602, filed on Sep. 15, 2020. The entirety the above-mentioned patent application is hereby incorporated by reference herein and made a part of this specification.

BACKGROUND

1. Field of the Disclosure

The present disclosure relates to a resin composition and an article made therefrom, more particularly to a resin composition useful for preparing a prepreg, a resin film, a laminate or a printed circuit board.

2. Description of Related Art

With the rapid advancement of the fifth generation mobile communication technology (5G), resin materials suitable for data transmission at high frequency and high speed have become the mainstream of laminate development; however, to satisfy the demands of low dissipation factor even at high temperature variation and high humidity variation, laminates have to meet the demands of low water absorption ratio and high thermal resistance after water absorption and at the same time maintain high dimensional stability (i.e., low thermal expansion) at high temperature, so as to make laminates operable normally in a high temperature and high humidity environment.

SUMMARY

To overcome the problems of prior arts, particularly one or more above-mentioned property demands facing conventional materials, it is a primary object of the present disclosure to provide a resin composition and an article made therefrom which may overcome at least one of the above-mentioned technical problems.

To achieve the above-mentioned object, the present disclosure provides a resin composition, comprising 80 parts by weight to 160 parts by weight of a vinyl-containing resin, 0.1 part by weight to 1.0 part by weight of a first compound and 0.1 part by weight to 2.0 parts by weight of a second compound;

wherein:

the vinyl-containing resin comprises a vinyl-containing polyphenylene ether resin, a maleimide resin, a bis(vinylphenyl)ethane, a triallyl isocyanurate, a vinyl-containing polyolefin resin or a combination thereof (unless otherwise specified, these components should be construed as including their modifications);

the first compound comprises a structure of Formula (1) to Formula (3) or a combination thereof:

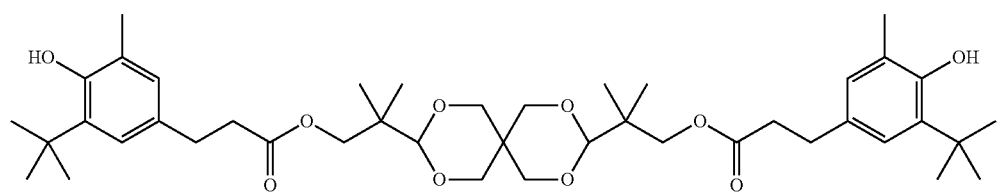

Formula (1)

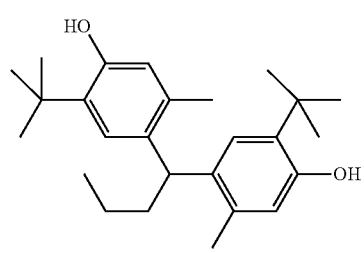

Formula (2)

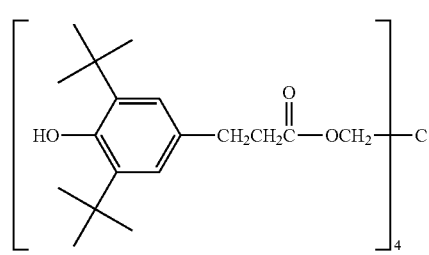

Formula (3)

the second compound comprises a structure of Formula (4) to Formula (6) or a combination thereof:

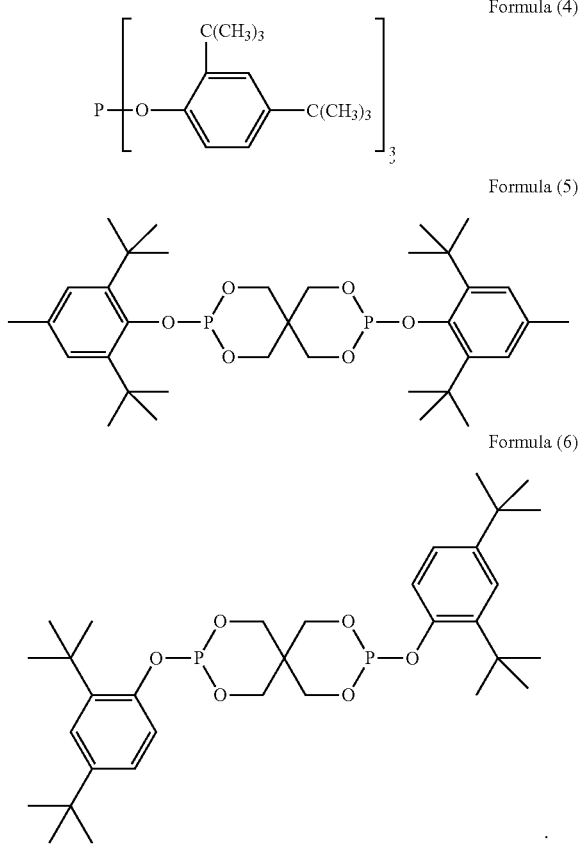

Formula (4)

Formula (5)

Formula (6)

For example, in one embodiment, the vinyl-containing polyphenylene ether resin comprises a vinylbenzyl-containing polyphenylene ether resin, a methacrylate-containing polyphenylene ether resin, a vinylbenzyl-containing bisphenol A polyphenylene ether resin, a chain-extended vinyl-containing polyphenylene ether resin or a combination thereof.

For example, in one embodiment, the resin composition disclosed herein is preferably characterized by not comprising a cycloolefin copolymer.

For example, in one embodiment, the resin composition disclosed herein may optionally further comprise cyanate ester resin, active ester, hydrogenated polyolefin resin, vinylbenzyl-dicyclopentadiene phenylene ether, bis(vinylbenzyl)ether, divinylbenzene, triallyl cyanurate, 1,2,4-trivinyl cyclohexane, diallyl bisphenol A, styrene monomer, polystyrene, acrylate, epoxy resin, phenolic resin, benzoxazine resin, styrene maleic anhydride resin, amine curing agent, polyamide, polyimide, or a combination thereof. Unless otherwise specified, these components should be construed as including their modifications. For example, in one embodiment, the content of any one of the aforesaid components may range from 1 part by weight to 40 parts by weight, preferably 5 parts by weight to 30 parts by weight.

For example, in one embodiment, the resin composition disclosed herein may optionally further comprise flame retardant, inorganic filler, curing accelerator, polymerization inhibitor, solvent, silane coupling agent, surfactant, coloring agent, toughening agent, core-shell rubber, light stabilizer, or a combination thereof. For example, in one embodiment, the content of any one of the aforesaid components may range from 0.01 part by weight to 300 parts by weight, such as but not limited to 0.01 part by weight to 3 parts by weight, 30 parts by weight to 80 parts by weight or 50 parts by weight to 300 parts by weight.

Another main object of the present disclosure is to provide an article made from the aforesaid resin composition, comprising a prepreg, a resin film, a laminate or a printed circuit board.

For example, in one embodiment, articles made from the resin composition disclosed herein have one, more or all of the following properties:
  a Z-axis coefficient of thermal expansion as measured by reference to IPC-TM-650 2.4.24.5 of less than or equal to 50 ppm/° C.;
  a Z-axis ratio of thermal expansion as measured by reference to IPC-TM-650 2.4.24.5 of less than or equal to 1.50%;
  a 72-hour water absorption ratio as measured by reference to IPC-TM-650 2.6.2.1a of less than or equal to 0.30%;
  a water absorption ratio after 5 hours of moisture absorption in a pressure cooking test as measured by reference to IPC-TM-650 2.6.16.1 of less than or equal to 0.50%;
  absence of delamination in a solder dip test conducted by reference to IPC-TM-650 2.4.23 after being subject to a pressure cooking test conducted by reference to IPC-TM-650 2.6.16.1;
  absence of weave exposure (e.g., dry board) or branch-like pattern under visual inspection; and
  a resin flow as measured by an inner resin flow test of 1 mm to 10 mm.

In another aspect, the present disclosure further provides a resin composition, comprising 40 parts by weight of a vinyl-containing polyphenylene ether resin, 0.1 part by weight to 1.0 part by weight of the aforesaid first compound and 0.1 part by weight to 2.0 parts by weight of the aforesaid second compound.

For example, in one embodiment, the vinyl-containing polyphenylene ether resin comprises a vinylbenzyl-containing polyphenylene ether resin, a methacrylate-containing polyphenylene ether resin, a vinylbenzyl-containing bisphenol A polyphenylene ether resin, a chain-extended vinyl-containing polyphenylene ether resin or a combination thereof.

For example, in one embodiment, the resin composition described above further comprises a maleimide resin, a bis(vinylphenyl)ethane, a triallyl isocyanurate, a vinyl-containing polyolefin resin or a combination thereof. For example, in one embodiment, the resin composition described above further comprises 5 parts by weight to 120 parts by weight of a maleimide resin, a bis(vinylphenyl)ethane, a triallyl isocyanurate, a vinyl-containing polyolefin resin or a combination thereof.

For example, in one embodiment, the maleimide resin comprises 4,4'-diphenylmethane bismaleimide, oligomer of phenylmethane maleimide, bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylyl maleimide, N-phenylmaleimide, vinyl benzyl maleimide, maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin, or a combination thereof.

For example, in one embodiment, the resin composition described above is also preferably characterized by not comprising a cycloolefin copolymer.

Moreover, the present disclosure also provides an article made from the resin composition described above, which comprises a prepreg, a resin film, a laminate or a printed circuit board.

DESCRIPTION OF THE EMBODIMENTS

Figure 1:
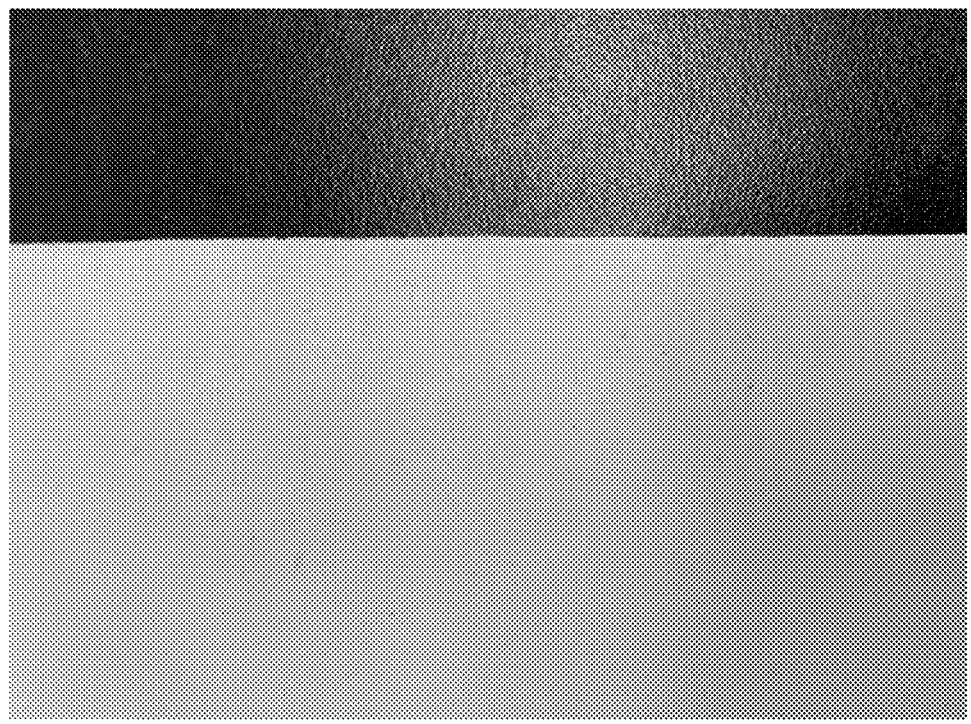
FIG. 1 shows the appearance of a laminate with dry board.

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, "or a combination thereof" means "or any combination thereof", and "any" means "any one", vice versa.

As used herein, the term "comprises," "comprising," "includes," "including," "encompass," "encompassing," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "encompassing," "has," "having" or any other variant thereof, it is understood that close-ended transitional phrases such as "consisting of," "composed by" and "remainder being" and partially open-ended transitional phrases such as "consisting essentially of," "primarily consisting of," "mainly consisting of," "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$," and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. A prepolymer refers to a polymer having a lower molecular weight between the molecular weight of monomer and the molecular weight of final polymer. For example, according to the present disclosure, a prepolymer of diallyl compound and maleimide resin refers to a product with an intermediate molecular weight obtained by subjecting the diallyl compound and maleimide resin to a certain degree of polymerization, the intermediate molecular weight being greater than the molecular weight of the diallyl compound and maleimide resin before reaction but less than the molecular weight of the final product obtained from a complete reaction; in addition, the prepolymer contains a reactive functional group capable of participating further polymerization to obtain the final high molecular weight product which has been fully crosslinked or cured. The term "polymer" includes but is not limited to an oligomer. An oligomer refers to a polymer with 2-20, typically 2-5, repeating units. For example, the term "diene polymer" as used herein is construed as comprising diene homopolymer, diene copolymer, diene prepolymer and diene oligomer. For example, the term "(meth)acrylate polymer" as used herein is construed as comprising (meth)acrylate homopolymer, (meth)acrylate copolymer, (meth)acrylate prepolymer and (meth)acrylate oligomer.

Unless otherwise specified, the term "resin" is a widely used common name of a synthetic polymer and is construed in the present disclosure as comprising monomer and its combination, polymer and its combination or a combination of monomer and its polymer, but not limited thereto. For example, in the present disclosure, the term "maleimide resin" is construed to encompass a maleimide monomer, a maleimide polymer, a combination of maleimide monomers, a combination of maleimide polymers, and a combination of maleimide monomer(s) and maleimide polymer(s).

For example, in the present disclosure, the term "vinyl-containing" is construed to encompass the inclusion of a vinyl group, a vinylene group, an allyl group, a (meth)acrylate group or a combination thereof.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from homopolymerizing a resin, a product derived from copolymerizing a resin and other resins, etc.

The unsaturated bond described herein, unless otherwise specified, refers to a reactive unsaturated bond, such as but not limited to an unsaturated double bond with the potential of being crosslinked with other functional groups, such as an unsaturated carbon-carbon double bond with the potential of being crosslinked with other functional groups, but not limited thereto.

Unless otherwise specified, according to the present disclosure, when the term acrylate or acrylonitrile is expressed as (meth)acrylate or (meth)acrylonitrile, it is intended to comprise both situations of containing and not containing a methyl group; for example, poly(meth)acrylate is construed as including polyacrylate and polymethacrylate. For example, (meth)acrylonitrile is construed as including acrylonitrile and methacrylonitrile.

Unless otherwise specified, an alkyl group and an alkenyl group described herein are construed to encompass various isomers thereof. For example, a propyl group is construed to encompass n-propyl and iso-propyl.

It should be understood that all features disclosed herein may be combined in any way to constitute the solution of the present disclosure, as long as there is no conflict present in the combination of these features.

Unless otherwise specified, as used herein, part(s) by weight represents weight part(s) in any weight unit, such as but not limited to kilogram, gram, pound and so on. For example, 100 parts by weight of the maleimide resin may represent 100 kilograms of the maleimide resin or 100 pounds of the maleimide resin.

The following embodiments and examples are illustrative in nature and are not intended to limit the present disclosure and its application. In addition, the present disclosure is not bound by any theory described in the background and summary above or the following embodiments or examples. Unless otherwise specified, processes, reagents and conditions described in the examples are those known in the art.

Generally, disclosed herein is a resin composition, comprising 80 parts by weight to 160 parts by weight of a vinyl-containing resin, 0.1 part by weight to 1.0 part by weight of a first compound and 0.1 part by weight to 2.0 parts by weight of a second compound;

wherein:

the vinyl-containing resin comprises a vinyl-containing polyphenylene ether resin, a maleimide resin, a bis(vinylphenyl)ethane, a triallyl isocyanurate, a vinyl-containing polyolefin resin or a combination thereof (unless otherwise specified, these components should be construed as including their modifications);

the first compound comprises a structure of Formula (1) to Formula (3) or a combination thereof:

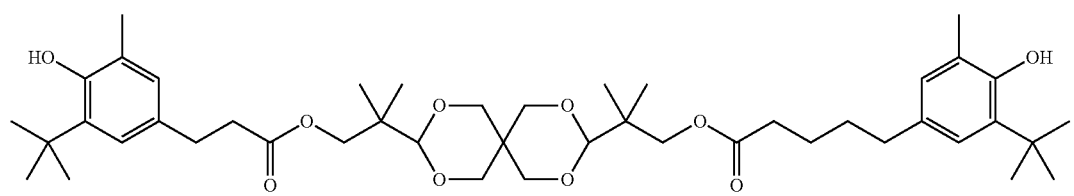

Formula (1)

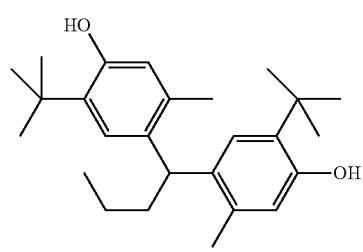

Formula (2)

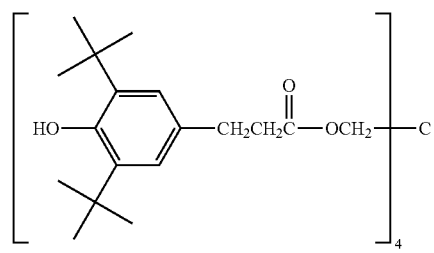

Formula (3)

the second compound comprises a structure of Formula (4) to Formula (6) or a combination thereof:

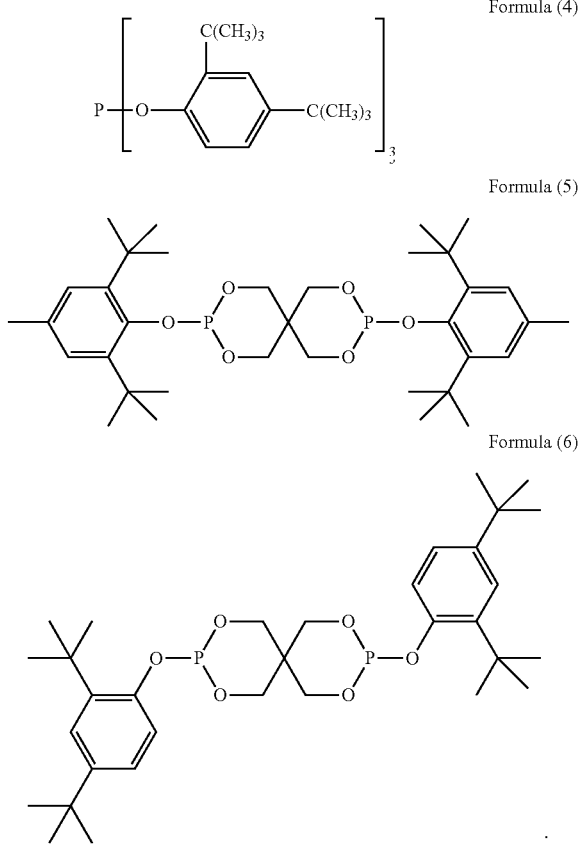

Formula (4)

Formula (5)

Formula (6)

In another aspect, the present disclosure also provides a resin composition, comprising 40 parts by weight of a vinyl-containing polyphenylene ether resin, 0.1 part by weight to 1.0 part by weight of the aforesaid first compound and 0.1 part by weight to 2.0 parts by weight of the aforesaid second compound. For example, the resin composition may optionally further comprise in an amount of 5 parts by weight to 120 parts by weight of a maleimide resin, a bis(vinylphenyl)ethane, a triallyl isocyanurate, a vinyl-containing polyolefin resin or a combination thereof.

Unless otherwise specified, the vinyl-containing polyphenylene ether resin described in various embodiments may comprise a vinylbenzyl-containing polyphenylene ether resin, a methacrylate-containing polyphenylene ether resin, a vinylbenzyl-containing bisphenol A polyphenylene ether resin, a chain-extended vinyl-containing polyphenylene ether resin or a combination thereof, but not limited thereto.

For example, in one embodiment, the vinyl-containing polyphenylene ether resin may comprise various vinyl-containing polyphenylene ether resins known in the art to which this disclosure pertains. The vinyl-containing polyphenylene ether resin suitable for the present disclosure is not particularly limited and may comprise any one or more commercially available products, self-prepared products, or a combination thereof. In some embodiments, examples of the vinyl-containing polyphenylene ether resin include: vinylbenzyl-containing polyphenylene ether resin (e.g., OPE-2st available from Mitsubishi Gas Chemical Co., Inc.), methacrylate-containing polyphenylene ether resin (e.g., SA9000 available from Sabic), vinylbenzyl-containing bisphenol A polyphenylene ether resin, chain-extended vinyl-containing polyphenylene ether resin or a combination thereof. The chain-extended vinyl-containing polyphenylene ether resin may include various polyphenylene ether resins disclosed in the US Patent Application Publication No. 2016/0185904 A1, all of which are incorporated herein by reference in their entirety.

For example, in one embodiment, the maleimide resin of the present disclosure comprises a monomer containing at least one maleimide group, its polymer, or a combination thereof. Unless otherwise specified, the maleimide resin used in the present disclosure is not particularly limited and may include any one or more maleimide resins useful for preparing a prepreg, a resin film, a laminate or a printed circuit board. In some embodiments, any one or more of the maleimide resins below may be used:

4,4'-diphenylmethane bismaleimide, oligomer of phenylmethane maleimide (a.k.a. polyphenylmethane maleimide), bisphenol A diphenyl ether bismaleimide, 3,3'-dimethyl-5,5'-diethyl-4,4'-diphenylmethane bismaleimide (a.k.a. bis-(3-ethyl-5-methyl-4-maleimidephenyl)methane), 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, vinyl benzyl maleimide (VBM), maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin, or a combination thereof. Unless otherwise specified, the maleimide resins described above should be construed as including the modifications thereof.

For example, the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Industry Co., Ltd., or products such as BMI-70 and BMI-80 available from K.I Chemical Industry Co., Ltd.

For example, the maleimide resin containing aliphatic long chain structure may include products such as BMI-689, BMI-1400, BMI-1500, BMI-1700, BMI-2500, BMI-3000, BMI-5000 and BMI-6000 available from Designer Molecules Inc.

For example, in one embodiment, the bis(vinylphenyl) ethane disclosed herein may include 1,2-bis(4-vinylphenyl) ethane, 1,2-(3-vinylphenyl-4-vinylphenyl)ethane, 1,2-bis(3-vinylphenyl)ethane or a combination thereof.

For example, in one embodiment, the triallyl isocyanurate disclosed herein is commercially available.

For example, in one embodiment, the vinyl-containing polyolefin resin disclosed herein may comprise any one or more commercially available products, self-prepared products, or a combination thereof. Examples include but are not limited to styrene-butadiene-divinylbenzene terpolymer, styrene-butadiene-maleic anhydride terpolymer, vinyl-polybutadiene-urethane oligomer, styrene-butadiene copolymer (such as but not limited to styrene-butadiene-styrene copolymer), styrene-isoprene copolymer, maleic anhydride-butadiene copolymer, polybutadiene (i.e., homopolymer of butadiene), or a combination thereof. Preferably, the vinyl-containing polyolefin resin does not contain a cycloolefin copolymer because the presence of a cycloolefin copolymer in the resin composition will greatly increase the ratio of thermal expansion and the coefficient of thermal expansion.

In one embodiment, for example, the resin composition disclosed herein may optionally further comprise cyanate ester resin, active ester, hydrogenated polyolefin resin, vinylbenzyl-dicyclopentadiene phenylene ether, bis(vinylbenzyl)ether, divinylbenzene, triallyl cyanurate, 1,2,4-trivinyl cyclohexane, diallyl bisphenol A, styrene monomer, polystyrene, acrylate, epoxy resin, phenolic resin, benzoxazine resin, styrene maleic anhydride resin, amine curing agent, polyamide, polyimide, or a combination thereof. Unless otherwise specified, these components should be construed as including their modifications. In one embodiment, for example, relative to 80 parts by weight to 160 parts by weight of the vinyl-containing resin, or relative to 40 parts by weight of the vinyl-containing polyphenylene ether resin, in the resin composition disclosed herein, the amount of any component described above may range from 1 part by weight to 40 parts by weight, such as 1 part by weight to 30 parts by weight, and the ratio therebetween may be adjusted according to the need. In another embodiment, for example, relative to 40 parts by weight of the vinyl-containing polyphenylene ether resin, in the resin composition disclosed herein, the amount of any component described above may range from 1 part by weight to 40 parts by weight, such as 1 part by weight to 30 parts by weight, and the ratio therebetween may be adjusted according to the need.

For example, the cyanate ester resin described in the present disclosure is not particularly limited and may be any compound with an Ar—O—C≡N structure, wherein Ar represents a substituted or unsubstituted aromatic group. Examples include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin, or a combination thereof. The novolac cyanate ester resin may comprise bisphenol A novolac cyanate ester resin, bisphenol F novolac cyanate ester resin, phenol novolac cyanate ester resin or a combination thereof. For example, the cyanate ester resin may be available under the product name primaset PT-15, PT-30S, PT-60S, BA-200, BA-230S, BA-3000S, BTP-2500, BTP-6020S, DT-4000, DT-7000, ULL-950S, HTL-300, CE-320, LUT-50 or LeCy sold by Lonza.

For example, the active ester described in the present disclosure may be any active polyester resins known in the field to which this disclosure pertains, including but not limited to various commercially available active polyester resin products. Examples include, but not limited to, active polyester resin products HPC-8000 and HPC-8150 available from D.I.C. Corporation.

For example, in one embodiment, the hydrogenated polyolefin resin disclosed herein may comprise any one or more commercially available products, self-prepared products, or a combination thereof. Examples include but are not limited to hydrogenated styrene-butadiene-divinylbenzene terpolymer, hydrogenated styrene-butadiene-maleic anhydride terpolymer, hydrogenated styrene-butadiene copolymer, hydrogenated styrene-isoprene copolymer or a combination thereof. The hydrogenated polyolefin resin described above does not contain a cycloolefin copolymer.

For example, in one embodiment, the vinylbenzyl-dicyclopentadiene phenylene ether described herein is not particularly limited and may comprise but not limited to a structure below:

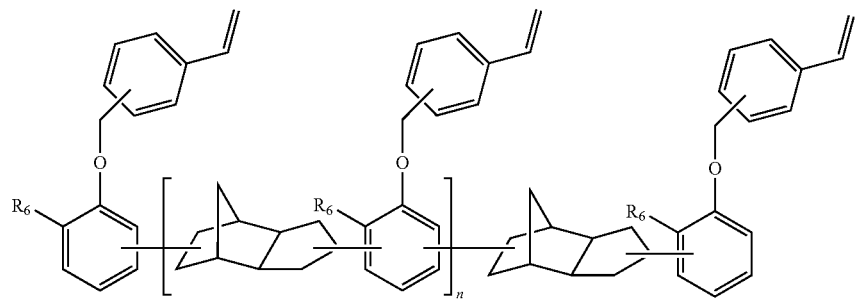

wherein each $R_6$ independently represents hydrogen, a $C_1$-$C_{20}$ straight chain alkyl group, a $C_3$-$C_{20}$ cycloalkyl group or a $C_6$-$C_{20}$ aryl group; and n is an integer of 1 to 10; preferably, $R_6$ is hydrogen or methyl group and n is an integer of 1 to 3.

For example, in one embodiment, the bis(vinylbenzyl) ether, divinylbenzene, triallyl cyanurate, 1,2,4-trivinyl cyclohexane, diallyl bisphenol A, styrene monomer or polystyrene suitable for the present disclosure is not particularly limited and may comprise various commercially available products.

For example, the acrylate suitable for the present disclosure is not particularly limited, examples including one or more acrylate compounds comprising two or more unsaturated bonds per molecule and various commercially available mono-functional acrylates.

For example, the epoxy resin suitable for the present disclosure may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may comprise DOPO-containing phenol novolac epoxy resin, DOPO-containing cresol novolac epoxy resin, DOPO-containing bisphenol-A novolac epoxy resin, or a combination thereof; the DOPO-HQ epoxy resin may comprise DOPO-HQ-containing phenol novolac epoxy resin, DOPO-HQ-containing o-cresol novolac epoxy resin, DOPO-HQ-containing bisphenol-A novolac epoxy resin, or a combination thereof.

For example, the phenolic resin suitable for the present disclosure may comprise, but not limited to, mono-functional, bifunctional or multifunctional phenolic resin, comprising the phenolic resin of a resin composition conventionally useful for making prepregs, such as phenoxy resin, phenol novolac resin, etc.

For example, the benzoxazine resin suitable for the present disclosure may include bisphenol A benzoxazine resin, bisphenol F benzoxazine resin, phenolphthalein benzoxazine resin, dicyclopentadiene benzoxazine resin, or phosphorus-containing benzoxazine resin, such as but not limited to LZ-8270 (phenolphthalein benzoxazine resin), LZ-8280 (bisphenol F benzoxazine resin), and LZ-8290 (bisphenol A benzoxazine resin) available from Huntsman or HFB-2006M available from Showa High Polymer.

For example, in the styrene maleic anhydride resin suitable for the present disclosure, the ratio of styrene (S) to maleic anhydride (MA) may be for example 1:1, 2:1, 3:1, 4:1, 6:1, 8:1 or 12:1, examples including styrene maleic anhydride resins such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope, but not limited thereto.

The amine curing agent suitable for the present disclosure may be any amine curing agents known in the field to which this disclosure pertains, including but not limited to various commercially available amine curing agent products. For example, in one embodiment, the amine curing agent described herein may be dicyandiamide, diamino diphenyl sulfone, diamino diphenyl methane, diamino diphenyl ether, diamino diphenyl sulfide or a combination thereof, but not limited thereto.

The polyamide suitable for the present disclosure may be any polyamide resins known in the field to which this disclosure pertains, including but not limited to various commercially available polyamide resin products.

The polyimide suitable for the present disclosure may be any polyimide resins known in the field to which this disclosure pertains, including but not limited to various commercially available polyimide resin products.

Moreover, in addition to the aforesaid components, the resin composition disclosed herein may optionally further comprise flame retardant, inorganic filler, curing accelerator, polymerization inhibitor, solvent, silane coupling agent, surfactant, coloring agent, toughening agent, core-shell rubber, light stabilizer or a combination thereof.

In one embodiment, for example, the flame retardant suitable for the present disclosure may be any one or more flame retardants useful for preparing a prepreg, a resin film, a laminate or a printed circuit board, examples including but not limited to phosphorus-containing flame retardant, preferably comprising: ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives (such as di-DOPO compounds) or resins, DPPO (diphenylphosphine oxide) and its derivatives (such as di-DPPO compounds) or resins, melamine cyanurate, tri-hydroxy ethyl isocyanurate, aluminium phosphinate (e.g., commercially available OP-930 and OP-935) or a combination thereof.

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, wherein DOPO-PN is a DOPO-containing phenol novolac resin, and DOPO-BPN may be a DOPO-containing bisphenol novolac resin, such as DOPO-BPAN (DOPO-bisphenol A novolac), DOPO-BPFN (DOPO-bisphenol F novolac) and DOPO-BPSN (DOPO-bisphenol S novolac).

The amount of the flame retardant is not particularly limited. In one embodiment, for example, relative to 80 parts by weight to 160 parts by weight of the vinyl-containing resin, or relative to 40 parts by weight of the vinyl-containing polyphenylene ether resin, in the resin composition disclosed herein, the amount of flame retardant described above may range from 5 parts by weight to 100 parts by weight, such as 5 parts by weight to 50 parts by weight or 30 parts by weight to 50 parts by weight. In another embodiment, for example, relative to 40 parts by weight of the vinyl-containing polyphenylene ether resin, in the resin composition disclosed herein, the amount of flame retardant described above may range from 5 parts by weight to 100 parts by weight, such as 5 parts by weight to 50 parts by weight or 30 parts by weight to 50 parts by weight.

In one embodiment, for example, the inorganic filler suitable for the present disclosure may be any one or more inorganic fillers suitable for preparing a prepreg, a resin film, a laminate or a printed circuit board, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate-modified talc, zinc oxide, zirconium oxide, mica, boehmite (A100H), calcined talc, talc, silicon nitride, or calcined kaolin. Moreover, the inorganic filler can be spherical, fibrous, plate-like, particulate, sheet-like or whisker-like in shape and can be optionally pretreated by a silane coupling agent.

Unless otherwise specified, relative to 80 parts by weight to 160 parts by weight of the vinyl-containing resin, or relative to 40 parts by weight of the vinyl-containing polyphenylene ether resin, in the resin composition disclosed herein, the amount of inorganic filler described above is not particularly limited and may range from 10 parts by weight to 300 parts by weight, for example. Preferably, the amount of inorganic filler described above may range from 100 parts by weight to 300 parts by weight or from 120 parts by weight to 250 parts by weight.

In one embodiment, for example, the curing accelerator suitable for the present disclosure may comprise a catalyst, such as a Lewis base or a Lewis acid. The Lewis base may comprise imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP), 4-dimethylamino pyridine (DMAP) or a combination thereof. The Lewis acid may comprise metal salt compounds, such as those of manganese, iron, cobalt, nickel, copper and zinc, such as zinc octanoate or cobalt octanoate. The curing accelerator also includes a curing initiator (or "initiator" for short), such as a peroxide capable of producing free radicals. Examples of the curing initiator may comprise, but not limited to: dibenzoyl peroxide (BPO), dicumyl peroxide, 2,5-dimethyl-2,5-di(t-butylperoxy)hexane, 2,5-dimethyl-2,5-di(t-butylperoxy)-3-hexyne (25B), di-t-butyl peroxide, di(t-butylperoxyisopropyl)benzene, di(t-butylperoxy)phthalate, di(t-butylperoxy) isophthalate, t-butyl peroxybenzoate, 2,2-di(t-butylperoxy)butane, 2,2-di(t-butylperoxy)octane, 2,5-dimethyl-2,5-di(benzoylperoxy)hexane, lauroyl peroxide, t-hexyl peroxypivalate, dibutylperoxyisopropylbenzene, bis(4-t-butylcyclohexyl) peroxydicarbonate, 2,3-dimethyl-2,3-diphenylbutane or a combination thereof.

Unless otherwise specified, the amount of the curing accelerator used herein may be adjusted according to the need. For example, relative to 80 parts by weight to 160 parts by weight of the vinyl-containing resin, or relative to 40 parts by weight of the vinyl-containing polyphenylene ether resin, in the resin composition disclosed herein, the amount of curing accelerator described above is not particularly limited and may range from 0.1 part by weight to 10 parts by weight, such as 0.1 part by weight to 0.5 part by weight or 1 part by weight to 10 parts by weight.

In one embodiment, for example, the polymerization inhibitor suitable for the present disclosure may inhibit the polymerization reaction. Examples thereof are not particularly limited, which may include various molecule type polymerization inhibitors, stable free radical type polymerization inhibitors or a combination thereof known in the field to which this disclosure pertains. For example, molecule type polymerization inhibitors suitable for the present disclosure include but are not limited to phenols, quinones, arylamines, arene nitro compounds, sulfur-containing compounds, chlorides of metal with variable valency or a combination thereof. More specifically, molecule type polymerization inhibitors suitable for the present disclosure include but are not limited to phenol, hydroquinone, 4-tert-butylcatechol, benzoquinone, chloroquinone, 1,4-naphthoquinone, trimethylquinone, aniline, nitrobenzene, $Na_2S$, $FeCl_3$, $CuCl_2$ or a combination thereof. For example, stable free radical type polymerization inhibitors suitable for the present disclosure include but are not limited to 1,1-diphenyl-2-picrylhydrazyl radical (DPPH), triphenylmethyl radical or a combination thereof.

The purpose of adding solvent according to the present disclosure is to dissolve the components in the resin composition so as to change the solid content of the resin composition and to adjust the viscosity of the resin composition. For example, the solvent may comprise, but not limited to, methanol, ethanol, ethylene glycol monomethyl ether, acetone, butanone (i.e., methyl ethyl ketone), methyl isobutyl ketone, cyclohexanone, toluene, xylene, methoxyethyl acetate, ethoxyethyl acetate, propoxyethyl acetate, ethyl acetate, propylene glycol methyl ether, dimethyl formamide, dimethyl acetamide, N-methyl-pyrrolidone, or a mixture thereof. The amount of solvent is not particularly limited and may be adjusted according to the viscosity required for the resin composition.

The silane coupling agent suitable for the present disclosure may comprise silane (such as but not limited to siloxane), which may be further categorized according to the functional groups into amino silane, epoxide silane, vinyl silane, ester silane, hydroxyl silane, isocyanate silane, methacryloxy silane and acryloxy silane. The amount of silane coupling agent is not particularly limited and may be adjusted according to the dispersivity of inorganic filler used in the resin composition.

The coloring agent suitable for the present disclosure may comprise, but not limited to, dye or pigment.

The purpose of toughening agent used herein is to improve the toughness of the resin composition. The toughening agent may comprise, but not limited to, carboxyl-terminated butadiene acrylonitrile rubber (CTBN rubber).

The resin compositions of various embodiments of the present disclosure may be processed by various methods into different articles, including but not limited to a prepreg, a resin film, a laminate or a printed circuit board.

For example, the resin compositions of various embodiments may be used to make prepregs.

In one embodiment, for example, the prepreg disclosed herein has a reinforcement material and a layered structure formed thereon, wherein the layered structure is made by heating the resin composition at high temperature to a semi-cured state (B-stage). Suitable baking temperature for making the prepreg may be for example 140° C. to 180° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pretreated by a silane coupling agent. The prepreg may be further heated and cured to the C-stage to form an insulation layer.

In one embodiment, for example, by well mixing the resin composition to form a varnish, loading the varnish into an impregnation tank, impregnating a fiberglass fabric into the impregnation tank to adhere the resin composition onto the fiberglass fabric, and finally heating and baking the resin composition at a proper temperature to a semi-cured state, a prepreg may be obtained.

In one embodiment, for example, the article made from the resin composition disclosed herein may be a resin film which is prepared by heating and baking the resin composition to the semi-cured state. For example, by selectively coating the resin composition on a liquid crystal polymer film, a polyethylene terephthalate film (PET film) or a polyimide film, followed by heating and baking at a proper temperature to a semi-cured state, a resin film may be obtained. For example, the resin composition from each embodiment may be coated on a copper foil to uniformly adhere the resin composition thereon, followed by heating and baking at a proper temperature to a semi-cured state to obtain the resin film.

In one embodiment, for example, the resin composition of the present disclosure may be made into a laminate, which comprises at least two metal foils and at least one insulation layer disposed between the metal foils, wherein the insulation layer is made by curing the resin composition at high temperature and high pressure to the C-stage, a suitable curing temperature being for example between 190° C. and 240° C. and preferably between 220° C. and 240° C., a suitable curing time being 60 to 180 minutes and preferably 90 to 150 minutes, and a suitable pressure being for example between 300 and 500 psi and preferably between 350 and 450 psi. The insulation layer may be obtained by curing the aforesaid prepreg or resin film. The metal foil may contain copper, aluminum, nickel, platinum, silver, gold or alloy thereof, such as a copper foil. In a preferred embodiment, the laminate is a copper-clad laminate.

In one embodiment, for example, the laminate may be further processed by trace formation processes to provide a printed circuit board. In one embodiment of making a printed circuit board, a double-sided copper-clad laminate (such as product EM-891, available from Elite Material Co., Ltd.) with a thickness of 28 mil and having 1 ounce (oz) HVLP (hyper very low profile) copper foils may be used, which is subject to drilling and then electroplating, so as to form electrical conduction between the top layer copper foil and the bottom layer copper foil. Then the top layer copper foil and the bottom layer copper foil are etched to form inner layer circuits. Then brown oxidation and roughening are performed on the inner layer circuits to form uneven structures on the surface to increase roughness. Next, a vacuum lamination apparatus is used to laminate the assembly containing a copper foil, the prepreg, the inner layer circuit, the prepreg and a copper foil stacked in said order by heating at 190 to 240° C. for 60 to 180 minutes to cure the insulation material of the prepreg. Next, black oxidation, drilling, copper plating and other known circuit board processes are performed on the outmost copper foils so as to obtain the printed circuit board.

In one embodiment, the resin composition disclosed herein may achieve improvement in one or more of the following properties of the article: thermal expansion (such as coefficient of thermal expansion or ratio of thermal expansion), water absorption property, thermal resistance after moisture absorption, appearance and inner resin flow.

For example, articles made from the resin compositions according to the present disclosure may achieve one, more or all of the following properties:
- a Z-axis coefficient of thermal expansion as measured by reference to IPC-TM-650 2.4.24.5 of less than or equal to 50 ppm/° C., such as between 30 ppm/° C. and 50 ppm/° C. or between 32 ppm/° C. and 48 ppm/° C.;
- a Z-axis ratio of thermal expansion as measured by reference to IPC-TM-650 2.4.24.5 of less than or equal to 1.50%, such as between 1.20% and 1.50% or between 1.23% and 1.46%;
- a 72-hour water absorption ratio as measured by reference to IPC-TM-650 2.6.2.1a of less than or equal to 0.30%, such as between 0.20% and 0.30% or between 0.23% and 0.29%;
- a water absorption ratio after 5 hours of moisture absorption in a pressure cooking test as measured by reference to IPC-TM-650 2.6.16.1 of less than or equal to 0.50%, such as between 0.30% and 0.50%, or between 0.32% and 0.42%;
- absence of delamination in a solder dip test conducted by reference to IPC-TM-650 2.4.23 after being subject to a pressure cooking test conducted by reference to IPC-TM-650 2.6.16.1;
- absence of weave exposure (e.g., dry board) or branch-like pattern under visual inspection; and
- a resin flow as measured by an inner resin flow test of 1 mm to 10 mm.

Raw materials below were used to prepare the resin compositions of various Examples and Comparative Examples of the present disclosure according to the amount listed in Table 1 to Table 4 and further fabricated to prepare test samples.

Materials and reagents used in Examples and Comparative Examples disclosed herein are listed below:

OPE-2st: OPE-2st 2200, bis-vinylbenzyl-terminated polyphenylene ether resin, available from Mitsubishi Gas Chemical Co., Inc.

SA9000: bis-methacrylate-terminated polyphenylene ether resin, available from Sabic.

BMI-70: 3,3'-dimethyl-5,5'-diethyl-4,4'-diphenylmethane bismaleimide, available from K.I Chemical Industry Co., Ltd.

BMI-2300: polyphenylmethane maleimide, available from Daiwakasei Industry Co., Ltd.

BVPE: bis(vinylphenyl)ethane, available from Linchuan Chemical Co., Ltd.

TAIC: triallyl isocyanurate, commercially available.

Ricon 150: polybutadiene, available from Cray Valley.

B-3000: polybutadiene, available from Nippon Soda Co., Ltd.

Ricon 130MA13: maleic anhydride-butadiene copolymer, available from Cray Valley.

D1118: styrene-butadiene copolymer, available from Kraton Polymers.

Compound of Formula (1): commercially available, CAS No.: 90498-90-1.

Compound of Formula (2): commercially available, CAS No.: 85-60-9.

Compound of Formula (3): commercially available, CAS No.: 6683-19-8.

Compound of Formula (4): commercially available, CAS No.: 31570-04-4.

Compound of Formula (5): commercially available, CAS No.: 80693-00-1.

Compound of Formula (6): commercially available, CAS No.: 26741-53-7.

Compound of Formula (7): commercially available, CAS No.: 2082-79-3.

Compound of Formula (8): commercially available, CAS No.: 3806-34-6.

Compound of Formula (9): commercially available, CAS No.: 29598-76-3.

G1726: hydrogenated styrene-butadiene copolymer, available from Kraton Polymers.

DCP: dicumyl peroxide, available from NOF Corporation.

DMDPB: 2,3-dimethyl-2,3-diphenylbutane, available from Wuxi Zhufeng Fine Chemical Co., Ltd.

523 hindered amine: commercially available, CAS No.: 129757-67-1.

TOPAS 5013: cycloolefin copolymer (copolymer of diene and cycloolefin), available from TOPAS.

SC2050 SMJ: spherical silica, available from Admatechs. In the Tables, "Y" represents the total amount of components excluding inorganic filler and solvent in the resin composition of each Example or each Comparative Example. In the Tables, "Y*1.5" represents the amount of solvent is 1.5 times of "Y". For example, in Example E1, "Y*1.5" represents that the amount of inorganic filler is 129.9 parts by weight (86.6 parts by weight multiplied by 1.5).

Solvent mixture: mixture of methyl ethyl ketone (MEK) and toluene in a ratio of 8:2, prepared by Applicant. In the Tables, "Z" represents the total amount of components excluding solvent in the resin composition of each Example or each Comparative Example. In the Tables, "Z*0.35" represents the amount of solvent is 0.35 time of "Z". For example, in Example E1, "Z*0.35" represents that the amount of solvent mixture is 75.775 parts by weight.

Compositions and test results of resin compositions of Examples and Comparative Examples are listed below (in part by weight):

TABLE 1

Resin compositions of Examples (in part by weight) and test results

| Component | Name | E1 | E2 | E3 | E4 | E5 | E6 |
|---|---|---|---|---|---|---|---|
| vinyl-containing polyphenylene ether resin | OPE-2st | | | | 20 | | |
| | SA9000 | 40 | 40 | 40 | 20 | 40 | 40 |
| maleimide resin | BMI-70 | 40 | 40 | 40 | 30 | 40 | 40 |
| | BMI-2300 | | | | 10 | | |
| bis(vinylphenyl)ethane | BVPE | | | | | | |
| triallyl isocyanurate | TAIC | | | | | | |
| vinyl-containing polyolefin resin | Ricon 150 | | | | | | |
| | B-3000 | | | | | | |
| | Ricon 130MA13 | | | | 10 | | |
| | D1118 | | | | | | |
| first compound | Formula (1) | 0.5 | | | 1.0 | 0.1 | 1.0 |
| | Formula (2) | | 0.5 | | | | |
| | Formula (3) | | | 0.5 | | | |
| second compound | Formula (4) | 1.0 | 1.0 | 1.0 | | 2.0 | 0.1 |
| | Formula (5) | | | | 2.0 | | |
| | Formula (6) | | | | | | |
| third compound | Formula (7) | | | | | | |
| fourth compound | Formula (8) | | | | | | |
| | Formula (9) | | | | | | |
| hydrogenated polyolefin resin | G1726 | | | | | | |
| curing accelerator | DCP | 0.1 | 0.1 | 0.1 | 0.1 | 0.1 | 0.1 |
| | DMDPB | 5 | 5 | 5 | 5 | 5 | 5 |
| light stabilizer | 523 hindered amine | | | | | | |
| cycloolefin copolymer | TOPAS 5013 | | | | | | |
| inorganic filler | SC2050 SMJ | Y*1.5 | Y*1.5 | Y*1.5 | Y*1.5 | Y*1.5 | Y*1.5 |
| solvent mixture | MEK:toluene = 8:2 | Z*0.35 | Z*0.35 | Z*0.35 | Z*0.35 | Z*0.35 | Z*0.35 |

| Property | Unit | E1 | E2 | E3 | E4 | E5 | E6 |
|---|---|---|---|---|---|---|---|
| Z-CTE ($\alpha 1$) | ppm/° C. | 38 | 42 | 39 | 43 | 36 | 32 |
| Z-PTE | % | 1.32% | 1.38% | 1.28% | 1.42% | 1.34% | 1.32% |
| ordinary water absorption ratio | % | 0.29% | 0.26% | 0.24% | 0.29% | 0.26% | 0.25% |
| PCT water absorption ratio | % | 0.42% | 0.38% | 0.36% | 0.38% | 0.37% | 0.37% |
| PCT thermal resistance | none | OOO | OOO | OOO | OOO | OOO | OOO |
| laminate appearance | none | OK | OK | OK | OK | OK | OK |
| resin flow | mm | 3-5 | 1-3 | 2-4 | 2-4 | 1-3 | 1-3 |

TABLE 2

Resin compositions of Examples (in part by weight) and test results

| Component | Name | E7 | E8 | E9 | E10 | E11 |
|---|---|---|---|---|---|---|
| vinyl-containing polyphenylene ether resin | OPE-2st | | | | | |
| | SA9000 | 40 | 40 | 40 | 40 | 40 |
| maleimide resin | BMI-70 | | | 40 | 40 | 40 |
| | BMI-2300 | | | | | |
| bis(vinylphenyl)ethane | BVPE | 40 | 40 | | 20 | |
| triallyl isocyanurate | TAIC | | | | 20 | |
| vinyl-containing polyolefin resin | Ricon 150 | 15 | | 40 | | |
| | B-3000 | | 10 | 40 | 40 | |
| | Ricon 130MA13 | 5 | 5 | | | |
| | D1118 | 20 | 10 | | | |
| first compound | Formula (1) | 0.3 | 0.8 | 0.5 | 0.5 | 0.5 |
| | Formula (2) | 0.1 | | | | |
| | Formula (3) | 0.1 | 0.2 | | | |

TABLE 2-continued

Resin compositions of Examples (in part by weight) and test results

| | | | | | | |
|---|---|---|---|---|---|---|
| second compound | Formula (4) | 1.0 | 1.0 | 1.0 | 1.0 | 1.0 |
| | Formula (5) | 0.5 | 0.5 | | | |
| | Formula (6) | | 0.5 | | | |
| third compound | Formula (7) | | | | | |
| fourth compound | Formula (8) | | | | | |
| | Formula (9) | | | | | |
| hydrogenated polyolefin resin | G1726 | | | 15 | | |
| curing accelerator | DCP | 0.3 | 0.5 | | 0.1 | 0.1 |
| | DMDPB | 1 | | 6 | 5 | 10 |
| light stabilizer | 523 hindered amine | | | | | |
| cycloolefin copolymer | TOPAS 5013 | | | | | |
| inorganic filler | SC2050 SMJ | Y*1.8 | Y*2.0 | Y*1.5 | Y*1.5 | Y*1.5 |
| solvent mixture | MEK:toluene = 8:2 | Z*0.35 | Z*0.35 | Z*0.35 | Z*0.35 | Z*0.35 |

| Property | Unit | E7 | E8 | E9 | E10 | E11 |
|---|---|---|---|---|---|---|
| Z-CTE (α1) | ppm/° C. | 47 | 46 | 48 | 44 | 43 |
| Z-PTE | % | 1.42% | 1.32% | 1.46% | 1.23% | 1.42% |
| ordinary water absorption ratio | % | 0.29% | 0.28% | 0.23% | 0.24% | 0.29% |
| PCT water absorption ratio | % | 0.38% | 0.38% | 0.32% | 0.33% | 0.39% |
| PCT thermal resistance | none | OOO | OOO | OOO | OOO | OOO |
| laminate appearance | none | OK | OK | OK | OK | OK |
| resin flow | mm | 1-3 | 1-3 | 5-10 | 3-8 | 3-5 |

TABLE 3

Resin compositions of Comparative Examples (in part by weight) and test results

| Component | Name | C1 | C2 | C3 | C4 | C5 | C6 |
|---|---|---|---|---|---|---|---|
| vinyl-containing polyphenylene ether resin | OPE-2st SA9000 | 40 | 40 | 40 | 40 | 40 | 40 |
| maleimide resin | BMI-70 BMI-2300 | 40 | 40 | 40 | 40 | 40 | 40 |
| bis(vinylphenyl)ethane | BVPE | | | | | | |
| triallyl isocyanurate | TAIC | | | | | | |
| vinyl-containing polyolefin resin | Ricon 150 B-3000 Ricon 130MA13 D1118 | | | | | | |
| first compound | Formula (1) | | | 0.5 | 0.5 | | |
| | Formula (2) | | | | | | |
| | Formula (3) | | | | | | |
| second compound | Formula (4) | 1.0 | 1.0 | | | | |
| | Formula (5) | | | | | | |
| | Formula (6) | | | | | | |
| third compound | Formula (7) | 0.5 | | | | 0.5 | |
| fourth compound | Formula (8) | | | 1.0 | | 1.0 | 1.0 |
| | Formula (9) | | | | | | |
| hydrogenated polyolefin resin | G1726 | | | | 1.0 | | |
| curing accelerator | DCP | | | | | | |
| | DMDPB | 0.1 | 0.1 | 0.1 | 0.1 | 0.1 | 0.1 |
| light stabilizer | 523 hindered amine | 5 | 5 | 5 | 5 | 5 | 5 |
| cycloolefin copolymer | TOPAS 5013 | | 0.5 | | | | 0.5 |
| inorganic filler | SC2050 SMJ | Y*1.5 | Y*1.5 | Y*1.5 | Y*1.5 | Y*1.5 | Y*1.5 |
| solvent mixture | MEK:toluene = 8:2 | Z*0.35 | Z*0.35 | Z*0.35 | Z*0.35 | Z*0.35 | Z*0.35 |

| Property | Unit | C1 | C2 | C3 | C4 | C5 | C6 |
|---|---|---|---|---|---|---|---|
| Z-CTE (α1) | ppm/° C. | 52 | 56 | 48 | 52 | 48 | 57 |
| Z-PTE | % | 1.92% | 2.08% | 1.82% | 1.86% | 1.83% | 1.87% |
| ordinary water absorption ratio | % | 0.38% | 0.41% | 0.29% | 0.31% | 0.31% | 0.35% |
| PCT water absorption ratio | % | 0.52% | 0.58% | 0.42% | 0.46% | 0.47% | 0.56% |
| PCT thermal resistance | none | XXX | XXX | OOO | XXX | OOO | XXX |
| laminate appearance | none | pattern | pattern | OK | dry board | OK | dry board |

TABLE 3-continued

Resin compositions of Comparative Examples (in part by weight) and test results

| resin flow | mm | >10 | >10 | 5-10 | no resin flow | 5-10 | no resin flow |
|---|---|---|---|---|---|---|---|

TABLE 4

Resin compositions of Comparative Examples (in part by weight) and test results

| Component | Name | C7 | C8 | C9 | C10 | C11 | C12 |
|---|---|---|---|---|---|---|---|
| vinyl-containing poly-phenylene ether resin | OPE-2st SA9000 | 40 | 40 | 40 | 40 | 40 | 40 |
| maleimide resin | BMI-70 BMI-2300 | 40 | 40 | 40 | 40 | 40 | 40 |
| bis(vinylphenyl)ethane | BVPE | | | | | | |
| triallyl isocyanurate | TAIC | | | | | | |
| vinyl-containing polyolefin resin | Ricon 150 B-3000 Ricon 130MA13 D1118 | | | | | | |
| first compound | Formula (1) | | | | | | |
| | Formula (2) | 0.5 | | 0.5 | | | 0.5 |
| | Formula (3) | | | 1.0 | | | |
| second compound | Formula (4) | | | | | | |
| | Formula (5) | | 1.0 | | 0.5 | | 1.0 |
| | Formula (6) | | | | 1.0 | | |
| third compound | Formula (7) | | | | | | |
| fourth compound | Formula (8) Formula (9) | | | | | | |
| hydrogenated polyolefin resin | G1726 | | | | | | |
| curing accelerator | DCP | 0.1 | 0.1 | 0.1 | 0.1 | 0.1 | 0.1 |
| | DMDPB | 5 | 5 | 5 | 5 | 5 | 5 |
| light stabilizer | 523 hindered amine | | | | | | |
| cycloolefin copolymer | TOPAS 5013 | | | | | | 80 |
| inorganic filler | SC2050 SMJ | Y*1.5 | Y*1.5 | Y*1.5 | Y*1.5 | Y*1.5 | Y*1.5 |
| solvent mixture | MEK:toluene = 8:2 | Z*0.35 | Z*0.35 | Z*0.35 | Z*0.35 | Z*0.35 | Z*0.35 |
| Property | Unit | C7 | C8 | C9 | C10 | C11 | C12 |
| Z-CTE (α1) | ppm/° C. | 48 | 53 | 40 | 55 | 51 | 66 |
| Z-PTE | % | 1.62% | 1.60% | 1.58% | 1.00% | 1.88% | 2.23% |
| ordinary water absorption ratio | % | 0.36% | 0.37% | 0.31% | 0.40% | 0.41% | 0.26% |
| PCT water absorption ratio | % | 0.59% | 0.66% | 0.52% | 0.62% | 0.67% | 0.41% |
| PCT thermal resistance | none | OOO | XXX | XXX | OOO | XXX | XXX |
| laminate appearance | none | OK | dry board | dry board | pattern | dry board | dry board |
| resin flow | mm | <1 | no resin flow | no resin flow | >10 | no resin flow | <1 |

Samples (specimens) for the properties measured above were prepared as described below and tested and analyzed under specified conditions below.

1. Prepreg: Resin composition from each Example (listed in Table 1 and Table 2) or each Comparative Example (listed in Table 3 and Table 4) was respectively well-mixed to form a varnish, in which the dissolvable solid state chemical reagents were all dissolved. Then the varnish was loaded to an impregnation tank, and a fiberglass fabric (e.g., 1078 L-glass fiber fabric, available from Asahi) was impregnated into the impregnation tank to adhere the resin composition onto the fiberglass fabric, followed by heating at 140° C. to 170° C. to the semi-cured state (B-stage) to obtain a prepreg. Each prepreg made from the 1078 L-glass fiber fabric has a resin content of about 78%.

2. Copper-free laminate (6-ply, formed by lamination of six prepregs, resin content of about 78%): Two 35 μm HVLP (hyper very low profile) copper foils and six prepregs obtained from 1078 L-glass fiber fabrics impregnated with each Example or Comparative Example were prepared and stacked in the order of one copper foil, six prepregs and one copper foil, followed by lamination and curing under vacuum at 420 psi and 240° C. for 2 hours to form a copper-clad laminate (6-ply, formed by lamination of six prepregs). Next, each copper-clad laminate was etched to remove the copper foils on both sides to obtain a copper-free laminate (6-ply) which has a resin content of about 78%.

For each sample, test items and test methods are described below.

Coefficient of Thermal Expansion (Z-CTE)

The copper-free laminate (obtained by laminating six prepregs) sample was tested by thermal mechanical analysis (TMA) during the measurement of Z-axis coefficient of thermal expansion. The copper-free laminate was cut into a sample with a length of 10 mm and a width of 10 mm. Each sample was heated from 35° C. to 300° C. at a temperature increase rate of 10° C./minute and then subject to the measurement of thermal expansion coefficient (ppm/° C.) in Z-axis in a range ($\alpha 1$) from 50° C. to 110° C. by reference to the processes described in IPC-TM-650 2.4.24.5. Lower Z-axis coefficient of thermal expansion represents a better dimensional expansion property. A difference in the Z-axis coefficient of thermal expansion of greater than or equal to 0.1 ppm/° C. represents a substantial difference. For example, articles made from the resin composition disclosed herein have a Z-axis coefficient of thermal expansion as measured by reference to IPC-TM-650 2.4.24.5 of less than or equal to 50 ppm/° C., such as between 30 ppm/° C. and 50 ppm/° C. or between 32 ppm/° C. and 48 ppm/° C.

Ratio of Thermal Expansion (a.k.a. Percent of Thermal Expansion, Z-Axis, Z-PTE)

The copper-free laminate (obtained by laminating six prepregs) sample was tested by thermal mechanical analysis (TMA) during the measurement of Z-axis ratio of thermal expansion. The copper-free laminate was cut into a sample with a length of 10 mm and a width of 10 mm. Each sample was heated from 35° C. to 300° C. at a temperature increase rate of 10° C./minute and then subject to the measurement of ratio of thermal expansion (%) in Z-axis from 50° C. to 260° C. by reference to the processes described in IPC-TM-650 2.4.24.5. Lower ratio of thermal expansion represents a better property of the sample. Generally, a difference in ratio of thermal expansion of greater than or equal to 0.1% represents a substantial difference. For example, articles made from the resin composition disclosed herein have a ratio of thermal expansion as measured by reference to IPC-TM-650 2.4.24.5 of less than or equal to 1.50%, such as between 1.20% and 1.50% or between 1.23% and 1.46%.

Water Absorption Ratio (72-Hour Ordinary Water Absorption Ratio)

In the water absorption ratio test, by reference to IPC-TM-650 2.6.2.1a, a 2 inch*2 inch copper-free laminate sample obtained by laminating six prepregs was placed in a 105±10° C. oven and baked for 1 hour, then cooled at room temperature of about 25° C. for 10 minutes and weighed to give a weight value W1 representing the weight of the copper-free laminate; then the copper-free laminate sample was immersed and soaked in pure water at room temperature for 72 hours, then withdrawn from the pure water and wiped to remove residual water on the surface, and the sample was weighed again to give a weight value W2 representing the weight of the copper-free laminate after water absorption. The water absorption ratio W was calculated as follow: W (%)=((W2−W1)/W1)×100%. The unit of water absorption ratio is %.

For example, articles made from the resin composition disclosed herein have a 72-hour water absorption ratio as measured by reference to IPC-TM-650 2.6.2.1a of less than or equal to 0.30%, such as between 0.20% and 0.30% or between 0.23% and 0.29%.

PCT (Pressure Cooking Test) Water Absorption Ratio

A 2 inch*2 inch copper-free laminate sample obtained by laminating six prepregs was placed in a 105±10° C. oven and baked for 1 hour, then cooled at room temperature of about 25° C. for 10 minutes and weighed to give a weight value W3 representing the weight of the copper-free laminate; then the sample was subject to a pressure cooking test (PCT) by reference to IPC-TM-650 2.6.16.1 for 5 hours of moisture absorption (test temperature of 121° C. and relative humidity of 100%) and wiped to remove residual water on the surface; the sample was weighed again to give a weight value W4 representing the weight of the copper-free laminate after water absorption. The PCT water absorption ratio W was calculated as follow: W (%)=((W4−W3)/W3) 100%. The unit of water absorption ratio is %.

For example, articles made from the resin composition disclosed herein have a water absorption ratio after 5 hours of moisture absorption in a pressure cooking test conducted by reference to IPC-TM-650 2.6.16.1 of less than or equal to 0.50%, such as between 0.30% and 0.50% or between 0.32% and 0.42%.

Thermal Resistance after Moisture Absorption (PCT & S/D, PCT Thermal Resistance)

The copper-free laminate specimen (obtained by laminating six prepregs) was subject to pressure cooking test (PCT) by reference to IPC-TM-650 2.6.16.1 and 5 hours of moisture absorption (test temperature of 121° C. and relative humidity of 100%), and then by reference to IPC-TM-650 2.4.23, the copper-free laminate specimen after moisture absorption was immersed into a 288° C. solder bath for 20 seconds, removed and inspected for the presence of delamination, which represents failure, such as whether interlayer delamination or blistering occurs between insulation layers. Interlayer delamination or blistering may occur between any layers of the laminate.

For example, articles made from the resin composition disclosed herein are characterized by the absence of delamination in a solder dip test conducted by reference to IPC-TM-650 2.4.23 after being subject to a pressure cooking test conducted by reference to IPC-TM-650 2.6.16.1.

Laminate Appearance

Figure 2:
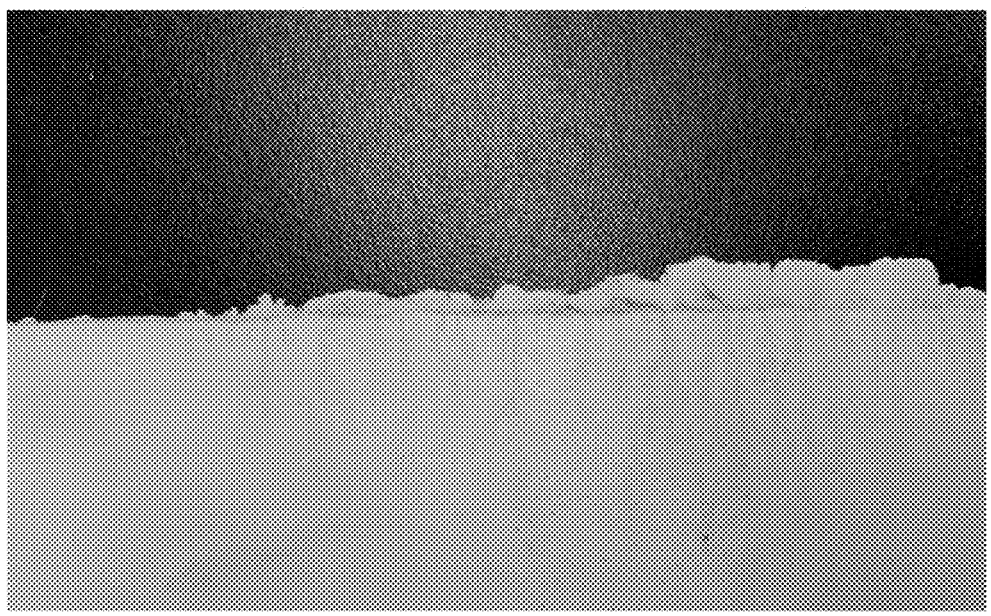
FIG. 2 shows the appearance of a laminate with branch-like pattern.
Figure 3:
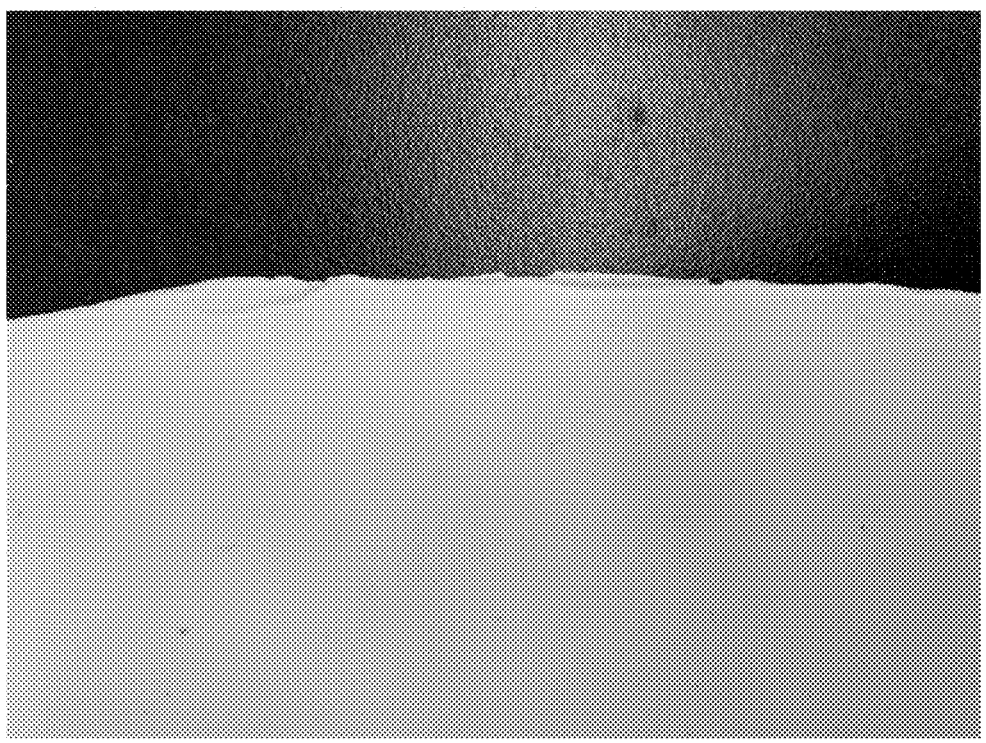
FIG. 3 shows the appearance of a normal laminate.

The aforesaid copper-free laminate (obtained by laminating six prepregs) was subject to visual inspection with naked eyes to determine whether dry board (as illustrated in FIG. 1, forming weave exposure) or branch-like pattern (as illustrated in FIG. 2) was present on the surface of the outmost insulation layer of the copper-free laminate. Absence of dry board and pattern represents normal appearance of the laminate (as illustrated in FIG. 3). A designation of "OK" in the test result was given to represent normal appearance of the laminate. If dry board was observed on the laminate surface, a designation of "dry board" was given. If branch-like pattern was observed on the laminate surface, a designation of "pattern" was given.

For example, articles made from the resin composition disclosed herein are characterized by the absence of weave exposure (e.g., dry board) or branch-like pattern under visual inspection.

Resin Flow (Inner Resin Flow)

First, an copper-clad laminate (EM-827, available from Elite Material Co., Ltd., using 7628 E-glass fiber fabric and 1-ounce HTE copper foil) having a thickness of 28 mil was subject to a conventional brown oxidation treatment process to obtain a brown oxide treated core.

A prepreg (using 1078 L-glass fiber fabric, resin content of about 78%, 17 inch*15 inch in size) prepared from each Example (E1 to E11) and each Comparative Example (C1 to C12) was prepared batchwise, wherein a 4 inch*4 inch rhombus opening was formed at the center of the prepreg by a conventional punching machine. A piece of 0.5-ounce HTE copper foil (in reverse position, i.e., in contact with the prepreg with its smooth surface), a prepreg and a brown oxide treated core (28 mil in thickness, 18 inch*16 inch in size) were superimposed in such order, followed by lamination and curing for 2 hours under vacuum at high temperature (235° C.) and high pressure (380 psi) to obtain a copper-clad multi-layer board. The surface copper foil in reverse position of the copper-clad multi-layer board was removed to obtain a sample for inner resin flow test. Each side of the 4 inch*4 inch rhombus shape of the sample for inner resin flow test was divided into four equal sections, and the resin flow (i.e., vertical distance of resin flow) of each of the twelve points was measured to calculate the average of resin flow at the twelve points and to provide the inner resin flow (as an average, in mm) of the sample. A difference in inner resin flow of 1 mm or greater represents a significant difference.

For example, articles made from the resin composition disclosed herein have a resin flow as measured by an inner resin flow test of 1 mm to 10 mm.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising 80 parts by weight to 160 parts by weight of a vinyl group-containing resin, 0.1 part by weight to 1.0 part by weight of a first compound and 0.1 part by weight to 2.0 parts by weight of a second compound;

wherein:

the vinyl group-containing resin comprises a vinyl group-containing polyphenylene ether resin, a maleimide resin, a bis(vinylphenyl)ethane, a triallyl isocyanurate or a combination thereof;

the first compound comprises a compound of Formula (1), a compound of Formula (2), a compound of Formula (3), or a combination thereof:

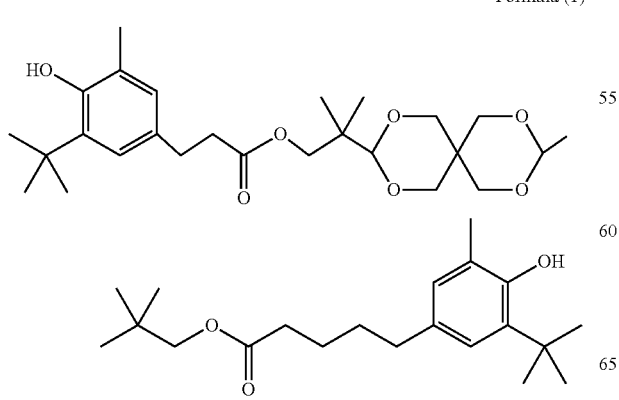

the second compound comprises a compound of Formula (4), a compound of Formula (5), a compound of Formula (6), or a combination thereof:

2. The resin composition of claim 1, wherein the vinyl group-containing polyphenylene ether resin comprises a vinylbenzyl group-containing polyphenylene ether resin, a methacrylate group-containing polyphenylene ether resin, a chain-extended vinyl group-containing polyphenylene ether resin or a combination thereof.

3. The resin composition of claim 1, characterized by not comprising a cycloolefin copolymer.

4. The resin composition of claim 1, further comprising cyanate ester resin, active ester, hydrogenated polyolefin resin, vinylbenzyl-dicyclopentadiene phenylene ether, bis (vinylbenzyl)ether, divinylbenzene, triallyl cyanurate, 1,2,4-trivinyl cyclohexane, diallyl bisphenol A, styrene monomer, polystyrene, acrylate, epoxy resin, phenolic resin, benzoxazine resin, styrene maleic anhydride resin, amine curing agent, polyamide, polyimide, or a combination thereof.

5. The resin composition of claim 1, further comprising flame retardant, inorganic filler, curing accelerator, polymerization inhibitor, solvent, silane coupling agent, surfactant, coloring agent, toughening agent, core-shell rubber, or a combination thereof.

6. An article made from the resin composition of claim 1, comprising a prepreg, a resin film, a laminate or a printed circuit board.

7. The article of claim 6, having a Z-axis coefficient of thermal expansion as measured by reference to IPC-TM-650 2.4.24.5 of less than or equal to 50 ppm/° C.

8. The article of claim 6, having a Z-axis ratio of thermal expansion as measured by reference to IPC-TM-650 2.4.24.5 of less than or equal to 1.50%.

9. The article of claim 6, having a 72-hour water absorption ratio as measured by reference to IPC-TM-650 2.6.2.1a of less than or equal to 0.30%.

10. The article of claim 6, having a water absorption ratio after 5 hours of moisture absorption in a pressure cooking test as measured by reference to IPC-TM-650 2.6.16.1 of less than or equal to 0.50%.

11. The article of claim 6, characterized by absence of delamination in a solder dip test conducted by reference to IPC-TM-650 2.4.23 after being subject to a pressure cooking test conducted by reference to IPC-TM-650 2.6.16.1.

12. The article of claim 6, characterized by absence of weave exposure or branch-like pattern under visual inspection.

13. A resin composition, comprising 40 parts by weight of a vinyl group-containing polyphenylene ether resin, 0.1 part by weight to 1.0 part by weight of a first compound and 0.1 part by weight to 2.0 parts by weight of a second compound; wherein:
the first compound comprises a compound of Formula (1), a compound of Formula (2), a compound of Formula (3), or a combination thereof:

the second compound comprises a compound of Formula (4), a compound of Formula (5), a compound of Formula (6), or a combination thereof:

Formula (4)
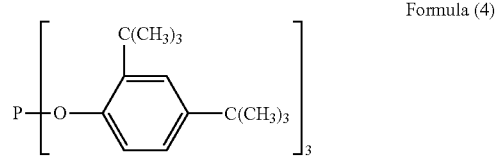

Formula (5)
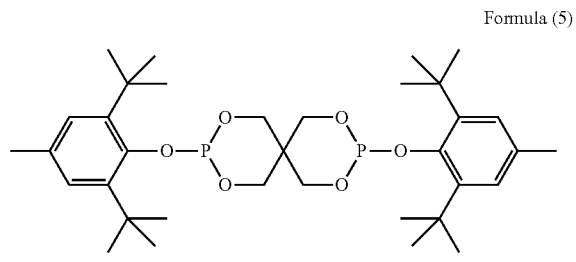

Formula (6)
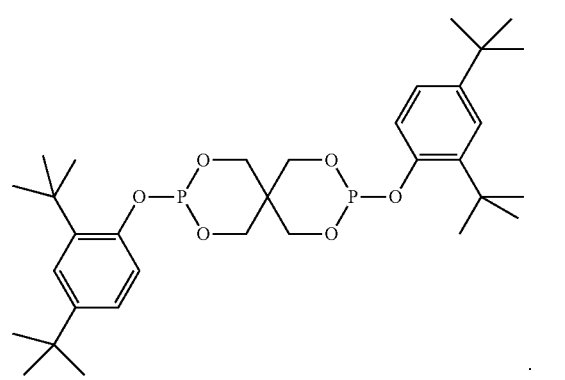

14. The resin composition of claim 13, wherein the vinyl group-containing polyphenylene ether resin comprises a vinylbenzyl group-containing polyphenylene ether resin, a methacrylate group-containing polyphenylene ether resin, a chain-extended vinyl group-containing polyphenylene ether resin or a combination thereof.

15. The resin composition of claim 13, further comprising a maleimide resin, a bis(vinylphenyl)ethane, a triallyl isocyanurate, a vinyl group-containing polyolefin resin or a Formula (1)
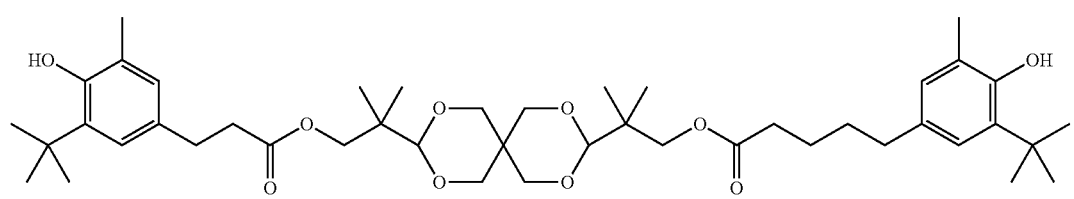

Formula (2)

Formula (3)
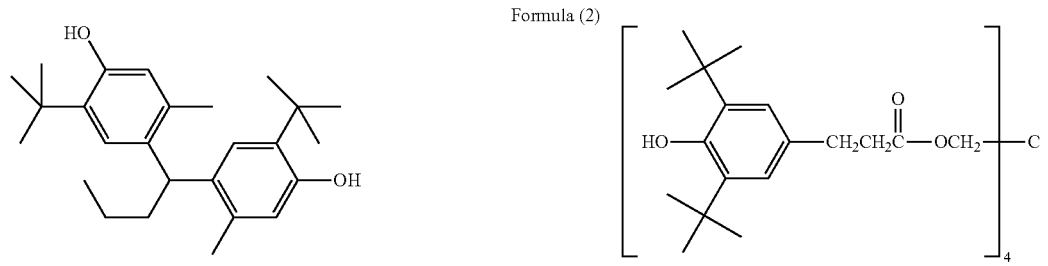

combination thereof in an amount of between 5 parts by weight and 120 parts by weight.

16. The resin composition of claim 15, wherein the maleimide resin comprises 4,4'-diphenylmethane bismaleimide, oligomer of phenylmethane maleimide, bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylyl maleimide, N-phenylmaleimide, vinyl benzyl maleimide, maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin, or a combination thereof, wherein the maleimide resin containing aliphatic long chain structure comprises:

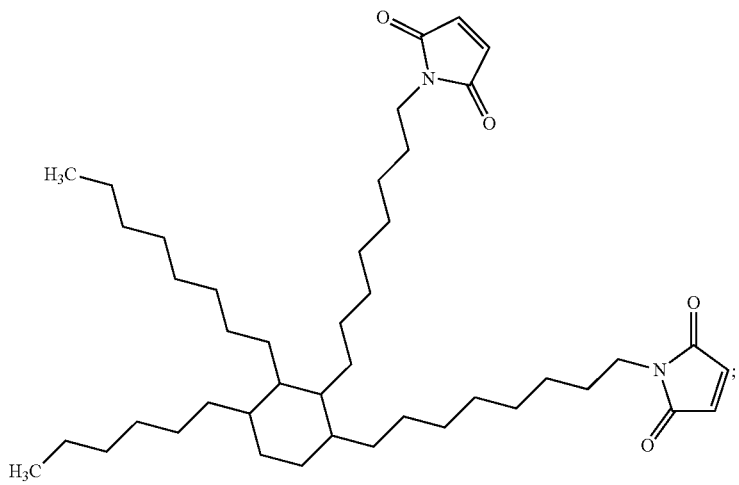

Formula (A)

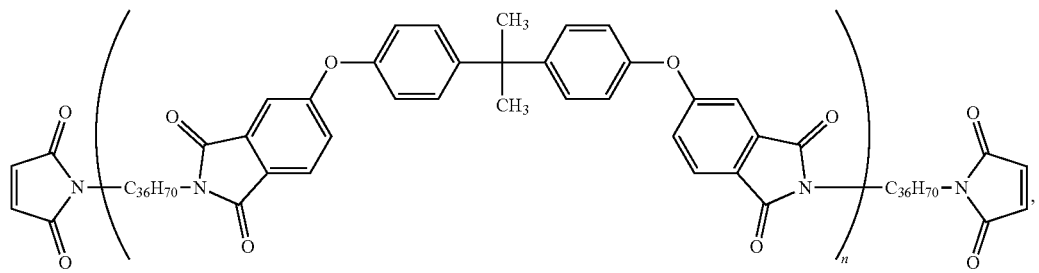

Formula (B)

wherein n=1 to 10;

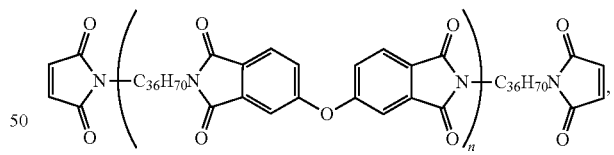

Formula (C)

wherein average n=1.3;

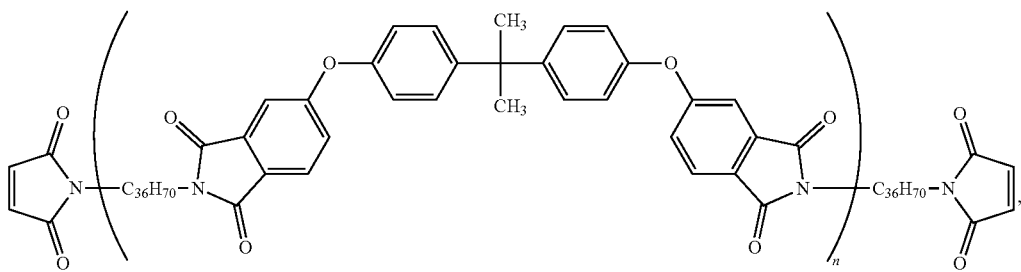

Formula (D)

wherein n=1 to 10;

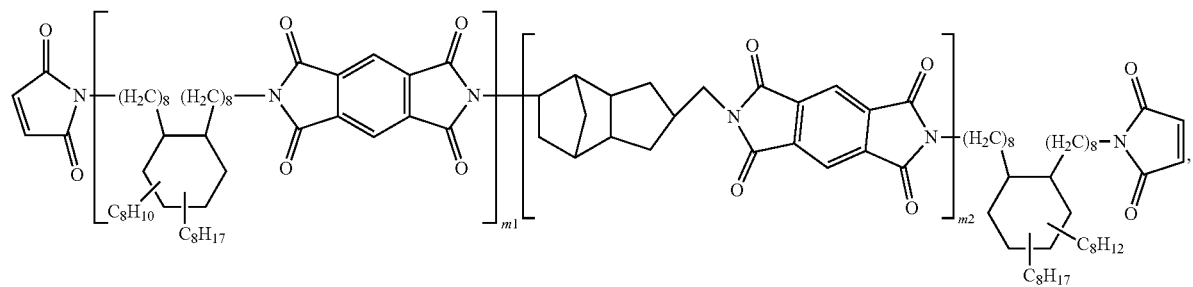

Formula (E)

wherein m1=3 (average), m2=3 (average); or

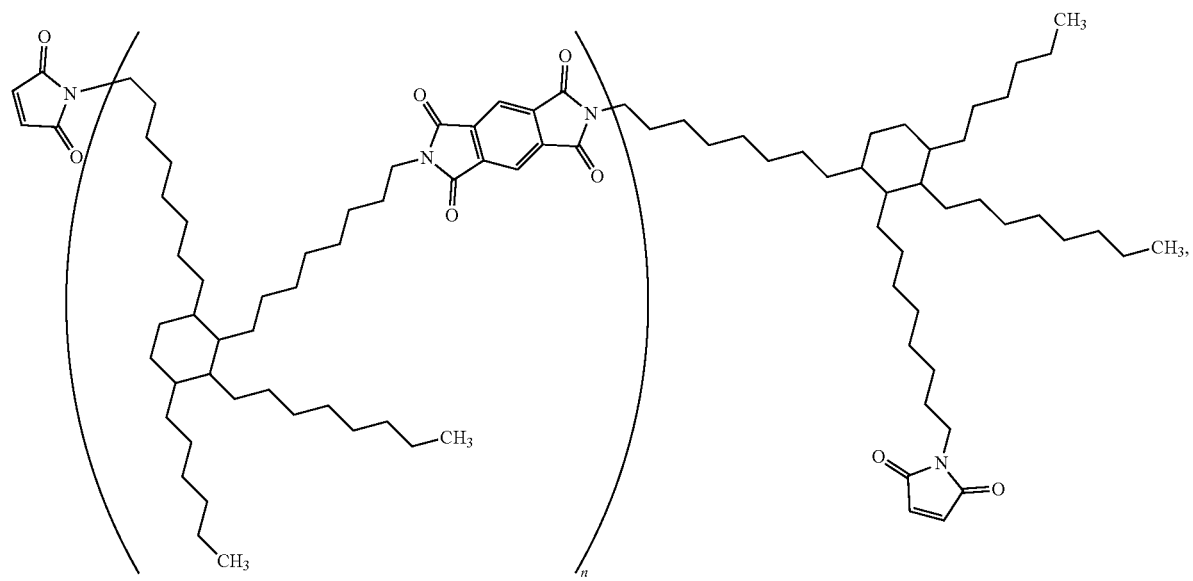

Formula (F)

wherein n=1 to 10.

17. The resin composition of claim 13, characterized by not comprising a cycloolefin copolymer.

18. An article made from the resin composition of claim 13, comprising a prepreg, a resin film, a laminate or a printed circuit board.

19. The article of claim 18, having a Z-axis coefficient of thermal expansion as measured by reference to IPC-TM-650 2.4.24.5 of between 30 ppm/° C. and 50 ppm/° C.

20. The article of claim 18, having a Z-axis ratio of thermal expansion as measured by reference to IPC-TM-650 2.4.24.5 of between 1.20% and 1.50%.

* * * * *